United States Patent
Garcia-Mallol

Patent Number: 5,259,123
Date of Patent: Nov. 9, 1993

[54] AERATION ROD-OUT ASSEMBLY

[75] Inventor: Juan A. Garcia-Mallol, Morristown, N.J.

[73] Assignee: Foster Wheeler Energy Corporation, Clinton, N.J.

[21] Appl. No.: 700,293

[22] Filed: May 15, 1991

[51] Int. Cl.⁵ .......................................... F26B 17/00
[52] U.S. Cl. .................... 34/57 R; 110/289; 110/245; 432/58; 122/4 D
[58] Field of Search ..... 34/57 R, 10, 179, 57 A–57 E, 34/169, 68, 54; 110/289, 290, 291, 245; 432/58; 431/7, 170, 326; 122/4 D; 422/143; 165/104.16

[56] References Cited

U.S. PATENT DOCUMENTS

| | | | |
|---|---|---|---|
| 2,069,193 | 1/1937 | Behr et al. | 34/169 |
| 2,676,095 | 4/1954 | DeVaney et al. | 34/54 |
| 2,903,800 | 9/1959 | Skoglund | 34/169 |
| 2,916,831 | 12/1959 | McCosh | 34/68 |
| 3,305,939 | 2/1967 | Sonnenschein et al. | 34/169 |
| 4,148,325 | 4/1979 | Solomon et al. | 34/68 |
| 4,419,965 | 12/1983 | Garcia-Mallol et al. | 122/4 D |
| 4,781,574 | 11/1988 | Taylor | 431/7 |
| 4,813,479 | 3/1989 | Wahlgren | 165/104.16 |

Primary Examiner—Henry A. Bennet
Assistant Examiner—Denise L. Gromada
Attorney, Agent, or Firm—Marvin A. Naigur

[57] ABSTRACT

An aeration rod-out assembly for aerating a flow of solids in a pipe is disclosed comprising an aeration pipe with first and second ends, the first end connected to the pipe containing the flow of solids and a cap connected to the second end. A rod is slidably disposed within the aeration pipe and said cap for axial movement therein between first, second and third positions such that as the rod is moved from its first position to its third position the rod ejects from the aeration pipe solids which settle into the housing. A shaft connected to the rod projects from the cap for actuation of the rod. First and second hoses register with the aeration pipe and the cap respectively to deliver aeration gas to the assembly, which gas discharges through the first end of the aeration pipe to aerate the flow of solids when the rod is in its first position but is substantially blocked from discharging when the rod is in or between its second and third positions.

36 Claims, 1 Drawing Sheet

AERATION ROD-OUT ASSEMBLY

BACKGROUND OF THE INVENTION

This invention relates to the aeration of particulate solids flow and, more particularly, to an aeration device which incorporates a rod-out assembly.

Many devices, such as the ordinary conveyor belt, can continuously transport solids and free-flowing bulk materials. Some solids, however, must be moved in a closed environment making open-air systems unsuitable. One such case is when the solids have been heated and heat losses must be prevented. Additionally, some solids chemically react with air or release toxic materials, and thus must be contained in a closed environment. It is therefore often necessary to transport solids within pipes.

To facilitate solids flow within a pipe, it is common to inject air or gas into the solids to cause them to behave in a fluid-like manner. This "aeration" process improves the flow characteristics of the solids by reducing their flow resistance. If a pipe is relatively long, however, aeration gas must be injected into the pipe at multiple intervals to maintain these improved flow characteristics and to prevent the solids from clumping.

A problem with current aeration assemblies is that a portion of the solids being transported through a pipe settle into the aeration assemblies thereby blocking the aeration gas. This problem is especially acute when the load of solids being transported is significantly reduced, as during the shutdown of a system, since the solids settle more rapidly.

SUMMARY OF THE INVENTION

It is therefore an object of the present invention to provide an aeration assembly which improves the flow characteristics of a stream of solids through a pipe by injecting aeration gas into the solids.

It is a further object of the present invention to provide an assembly of the above type which can dislodge and eject solids which settle within the assembly.

It is a still further object of the present invention to provide an assembly of the above type which can block the flow of aeration gas when aeration of the solids is not required.

It is a still further object of the present invention to provide an assembly of the above type which can be easily disassembled for maintenance.

Toward the fulfillment of these and other objects, the aeration assembly of the present invention includes a rod disposed within an aeration pipe which can be actuated by a shaft to eject solids from the aeration pipe. The aeration gas is delivered to the aeration pipe through an aeration air hose and a purge air hose. The purge air hose is connected to the aeration pipe behind the rod to prevent solids from settling between the rod and the aeration pipe. The aeration air can be controlled by positioning the rod to block the flow of aeration gas from the aeration air hose or by providing a valve assembly within the aeration air hose.

BRIEF DESCRIPTION OF THE DRAWINGS

The above brief description, as well as further objects, features and advantages of the present invention, will be more fully appreciated by reference to the following detailed description of presently preferred but nonetheless illustrative embodiments in accordance with the present invention when taken in conjunction with the accompanying drawings wherein.

DESCRIPTION OF THE PREFERRED EMBODIMENT

Figure 1:
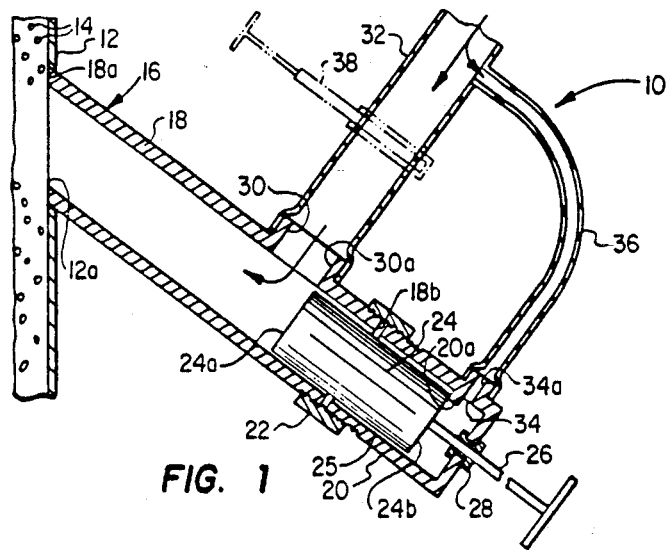
FIG. 1 is a cross-sectional view depicting the aeration assembly of the present invention in its aeration "ON" mode.

Referring to FIG. 1 of the drawings, the reference numeral 10 refers in general to the aeration assembly of the present invention which is adapted to introduce gas into a pipe 12 through which a stream of solids 14 flows.

The assembly 10 includes a housing 16 formed by an aeration pipe 18 having a first end 18a and a second end 18b and a tubular end cap 20 connected to the end 18b. The respective bores of the pipe 18 and the cap 20 define a continuous bore extending from the end 18a of the pipe 18 to the closed end of the cap 20. The connection of the cap 20 to the pipe 18 can be in the form of a weld, but in the preferred embodiment, the end 18b of the pipe 18 and the corresponding end of the cap 20 are externally threaded and are connected by an internally threaded nut 22. Formed on an interior wall of the cap 20 is a shoulder 20a whose purpose is described below.

To introduce air into the pipe 12 and aerate the solids 14, the end 18a of the pipe 18 registers with an aeration port 12a formed in the pipe 12. The pipe 18 is mounted so that it discharges upwardly, as viewed in FIG. 1, into the solids 14 to take advantage of the greater penetration achieved by upwardly flowing jets.

A rod 24 having two ends 24a and 24b and a diameter slightly less than the inside diameter of the pipe 18 and the cap 20 is disposed in the continuous bore defined by the pipe 18 and the cap 20 for axial movement therein. An annular gap 25 is defined between the rod 24 and the inner walls of the pipe 18 and the cap 20 and is exaggerated in the drawings for the convenience of presentation. The rod 24 is moveable between a fully retracted position, shown in FIG. 1, and a fully extended position shown in FIG. 2. In its fully retracted position of FIG. 1, the rod 24 extends within the cap 20 and its end 24b rests against the shoulder 20a of the cap 20. In its fully extended position of FIG. 2, the end 24a of the rod 24 extends into the port 12a.

Figure 3:
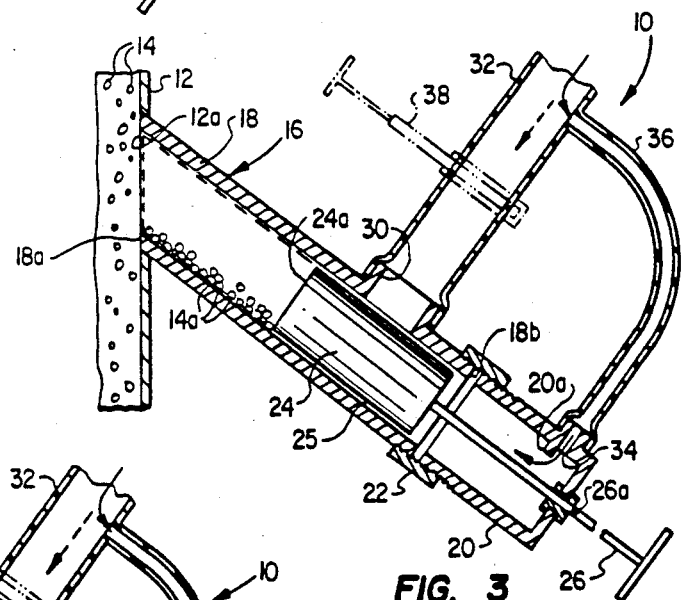
FIG. 3 is a view similar to FIG. 1 but showing the present invention in its aeration "OFF" mode.
Figure 2:
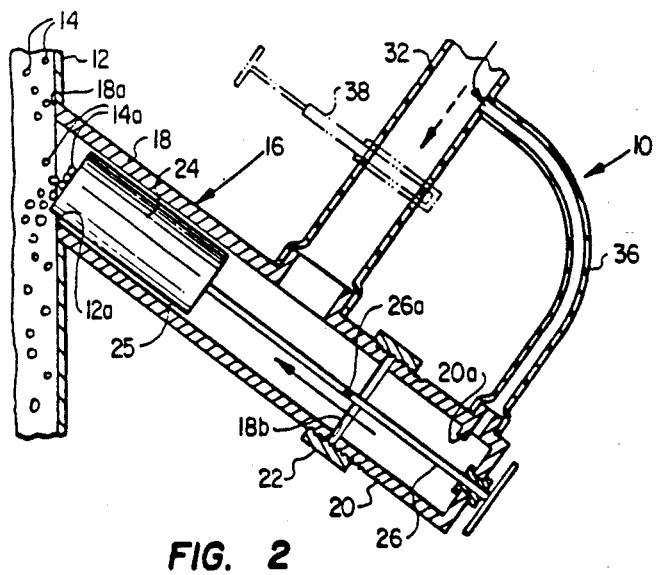
FIG. 2 is a view similar to FIG. 1 but showing the present invention in its ejection mode.

A shaft 26 is used to control the placement of the rod 24 within the pipe 18 and the cap 20, is connected to the end 24b of the rod 24 and projects from the housing 16 through a packing gland 28 in the cap 20. The packing gland 28 exerts sufficient static friction on the shaft 26 to enable the rod 24 to be maintained at any desired point within the pipe 18. As shown in FIGS. 2 and 3, index markings 26a which relate to certain positions of the rod 24 within the pipe 18 and the cap 20 are marked on the shaft 26 to apprise the operator of the assembly 10 of the location of the rod 24.

Referring to FIG. 1, an aeration air inlet 30 is formed through the wall of the pipe 18 between the port 12a and the location of the end 24a of the rod 24 when the rod is in its fully retracted position. For reasons explained below, the inlet 30 is formed immediately adjacent to the end 24a when the rod 24 is fully retracted, so that the rod 24 obstructs the inlet 30 immediately after corresponding movement of the shaft 26, and therefore the rod 24, in a right-to-left direction as viewed in FIG. 1.

A lip 30a surrounds the inlet 30 to receive an aeration hose 32 which connects the pipe 18 to a source of aeration gas (not shown). The aeration gas can be composed of any ga, including air, depending upon the characteristics of the solids 14 being aerated.

A purge air inlet 34 is formed through the wall of the cap 20 between the closed end of the cap 20 and the shoulder 20a. A lip 34a surrounds the inlet 34 to receive a purge air hose 36 which is substantially smaller in diameter than the hose 32. The hose 36 is connected to the hose 32 to divert a portion of the aeration gas into the hose 36 and therefore into the cap 20 via the inlet 34. The shoulder 20a prevents the rod 24 from ever obstructing the flow of aeration gas through the inlet 34.

FIG. 3 shows the assembly 10 in its aeration "OFF" mode. In this mode, the rod 24 is positioned, by corresponding movement of the shaft 26, within the pipe 18 between the fully retracted and fully extended positions of the rod 24 so that the rod 24 obstructs the inlet 30. With the rod 24 in this position, while a small portion of the aeration gas might still flow through the inlet 30 into the gap 25, the majority of the aeration gas is forced to flow through the hose 36, into the cap 20 and through the gap 25 between the rod 24 and the pipe 18. Since the diameter of the hose 36 is substantially smaller than the diameter of the hose 32 and the cross-sectional area of the gap 25 is substantially smaller than the diameter of the pipe 18, less aeration gas flows through the hose 36 and the gap 25 than when the assembly 10 is in its aeration "ON" mode as described below. The size of the gap 25 is designed such that the aeration gas flow through the gap 25 is insufficient to aerate the pipe 12 but sufficient to prevent any of the solids 14 from becoming lodged in the gap 25.

Due to this reduced flow of aeration gas, it is likely that numerous solids will flow from the pipe 12 into the pipe 18 as shown by the reference numeral 14a in FIG. 3. Therefore, before the assembly 10 can be used to aerate the solids 14 in the pipe 12, the settled solids 14a must be ejected from the pipe 18. To eject the settled solids 14a, the shaft 26 is actuated to engage and push the rod 24 towards the port 12a. As the rod 24 progresses through the pipe 18, the settled solids 14a collect against the end 24a while also being prevented from becoming lodged in the gap 25 by the continuous flow of aeration gas through the hose 36 and through the hose 32 after the rod 24 passes by the inlet 30.

As the rod 24 reaches its fully extended position shown in FIG. 2, all of the settled solids 14a are ejected from the pipe 18 back into the pipe 12. The assembly 10 is now ready to aerate the flow of solids 14 in the pipe 12. The rod 24 is therefore fully retracted to the position shown in FIG. 1 by pulling on the shaft 26 until the end 24b engages the shoulder 20a. In its fully retracted position or aeration "ON" mode, the rod 24 no longer obstructs the inlet 30 and aeration gas flows through the hose 32, into the pipe 18 and then into the pipe 12 to aerate the flow of solids 14. Simultaneously, the flow of aeration gas through the hose 36 is reduced since most of the gas will flow through the larger hose 32. However, a portion of the aeration gas is still diverted from the hose 32 to the hose 36 to maintain a flow of aeration gas behind the rod 24 and the gap 25 to prevent any solids 14 from lodging in the gap 25.

Several advantages result from the foregoing. First, the assembly 10, when connected to a pipe transporting a flow of solids, improves the flow characteristics of the solids by injecting aeration gas into the pipe 12. Further, the rod 24 dislodges and ejects solids from the aeration pipe 18. Also, the rod 24 can be used to control the flow of aeration air by blocking, or partially blocking, the aeration air inlet 30. Additionally, the connection of the aeration pipe 18 to the cap 20 by means of the removable nut 22 allows the assembly 10 to be easily disassembled for cleaning and maintenance.

It is understood that several variations may be made in the foregoing without departing from the scope of the present invention. For example, as shown by the broken lines in the drawings, a valve assembly 38 can be disposed within the hose 32 to provide further regulation of the flow of aeration gas into the pipe 18 through the inlet 30. Additionally, and as shown by broken lines in FIG. 3, the rod 24 can be elongated so that it blocks the inlet 30 even when its end 24a extends into the port 12a. As also shown by the broken lines in FIG. 3, the end 24a of the rod 24 can also be angled to be aligned with the pipe 12 when the rod 24 is in its fully-extended position. Further, the hose 36 need not be connected to the hose 32 but rather can be connected to an independent source of aeration gas.

Other modifications, changes and substitutions are also intended in the foregoing disclosure and although the invention has been described with reference to a specific embodiment, the foregoing description is not to be construed in a limiting sense. Various modifications to the disclosed embodiment as well as alternative applications of the invention will be suggested to persons skilled in the art by the foregoing specification and illustrations. Accordingly, it is appropriate that the appended claims be construed broadly and in a manner consistent with the true scope of the invention therein.

What is claimed is:

1. An aeration assembly for introducing gas into a pipe containing solids, said assembly comprising:
   a housing having an end registering with said pipe;
   means to deliver said gas into said housing;
   means to discharge said gas from said housing into said pipe to aerate said solids in said pipe; and
   means slidably disposed within said housing to eject from said housing into said pipe andy of said solids which flow from said pipe into said housing.

2. The assembly of claim 1 wherein said ejecting means also controls the flow of said gas into said housing through said delivery means.

3. The assembly of claim 1 wherein said housing has at least one inlet formed therein and said delivery means comprises a hose registering with said inlet.

4. The assembly of claim 1 wherein said ejecting means comprises a rod disposed within said housing for axial movement therein between first and second positions.

5. The assembly of claim 4 wherein said rod ejects said solids from said housing as it moves from said first position to said second position.

6. The assembly of claim 4 or 5 wherein said rod permits the discharge of said gas from said housing into said pipe when said rod is in said first position, and prevents a majority of said gas from discharging into said pipe when said rod is in said second position.

7. The assembly of claim 4 further comprising means for introducing said gas to the gap between said rod and the inner wall of said housing to prevent said solids from lodging in said gap.

8. The assembly of claim 4 further comprising a shaft connected to said rod and projecting from said housing for moving said rod between said first and second positions.

9. The assembly of claim 6 wherein
   said housing has a first inlet formed therein between said end of said housing and the location of said rod when said rod in in its first position,
   said housing has a second inlet formed therein between another end of said housing and the location of said rod when said rod is in its first position, and
   said delivery means comprises first and second hoses respectively registering with said inlets to deliver said gas to said housing.

10. The assembly of claim 9 wherein the diameter of said rod is slightly less than the inside diameter of said housing thereby forming a gap between said rod and the inner wall of said housing, said gas flowing from said second hose, into said housing and through said gap to prevent said solids from lodging in said gap.

11. The assembly of claim 9 wherein said second hose is connected to said first hose to divert a portion of said gas from said first hose.

12. The assembly of claim 6 wherein said housing comprises:
   an aeration pipe having first and second ends with said first end of said aeration pipe registering with said pipe containing said solids and said aeration pipe having an inlet between said first end of said aeration pipe and the location of said rod when said rod is in its first position; and
   a cap connected to said second end of said aeration pipe, said cap having an inlet.

13. The assembly of claim 12 wherein said cap and said second end of said aeration pipe are externally threaded, said assembly further comprising an internally threaded nut which connects said cap to said second end of said aeration pipe.

14. The assembly of claim 13 wherein said delivery means comprises first and second hoses respectively registering with said aeration pipe inlet and said cap inlet.

15. The assembly of claim 14 wherein said second hose is connected to said first hose to divert a portion of said gas from said first hose.

16. The assembly of claim 12 further comprising a shoulder formed on the inside wall of said cap between said cap inlet and said aeration pipe to arrest the movement of said rod and prevent said rod from obstructing said cap inlet.

17. The assembly of claim 9 or 14 further comprising a valve disposed within said first hose to control the flow of said gas through said first hose.

18. An aeration assembly for introducing gas into a pipe containing solids, said assembly comprising:
   a housing having an outlet registering with said pipe;
   at least one inlet in said housing in a spaced relation with said outlet for receiving said gas from an external source; and
   means slidably disposed and movable rectalinearly within said housing, to and from predetermined positions, for
   ejecting any of said solids which flow from said pipe into said housing and
   controlling the flow of said gas through said housing and to said pipe.

19. The assembly of claim 18 wherein said ejecting and controlling means comprises a rod disposed within said housing for axial movement therein between first and second positions.

20. The assembly of claim 19 wherein said rod
   ejects said solids from said housing as it moves from said first position to said second position, and
   controls the flow of said gas by permitting the discharge of said gas from said housing into said pipe when said rod is in said first position and by preventing a majority of said gas from discharging to said pipe when said rod is in said second position.

21. The assembly of claim 20 further comprising:
   an additional inlet in said housing, further spaced from said outlet than said first inlet, for receiving said gas from an external source; and
   a shoulder formed on the inner wall of said housing between said first and said additional inlets to arrest the movement of said rod and prevent said rod from obstructing said additional inlet, whereby said additional inlet introduces said gas into said housing so that said gas must flow through the gap between said rod and the inner wall of said housing to discharge through said outlet thereby preventing said solids from lodging in said gap.

22. The assembly of claim 21 further comprising first and second hoses respectively registering with said first and additional inlets to deliver said gas to said housing, said second hose connected to said first hose to divert a portion of said gas from said first hose to said second hose.

23. The assembly of claim 22 further comprising a valve disposed within said first hose to control the flow of said gas through said first hose.

24. The assembly of claim 22 wherein said housing comprises:
   an aeration pipe comprising said first inlet and having first and second ends with said first end registering with said pipe containing said solids; and
   a cap comprising said shoulder and said additional inlet, said cap connected to said second end of said aeration pipe.

25. The assembly of claim 24 wherein said cap and said second end of said aeration pipe are externally threaded, said assembly further comprising an internally threaded nut which connects said cap to said aeration pipe.

26. The assembly of claim 19 further comprising a shaft connected to said rod and projecting from said housing for moving said rod between said first and second positions.

27. An aeration assembly for introducing gas into a pipe containing solids, said assembly comprising:
   a housing having an outlet registering with said pipe;
   means slidably disposed and movable rectalinearly within said housing, to and from predetermined positions, for controlling the flow of said gas through said housing and to said pipe; and
   means for receiving said gas from an external source and introducing said gas between said housing and said controlling means to prevent said solids from lodging in the gap defined between said housing and said controlling means.

28. The assembly of claim 27 wherein said controlling means comprises a rod disposed within said housing for axial movement therein between first and second positions.

29. The assembly of claim 28 wherein said rod controls the flow of said gas by permitting the discharge of said gas from said housing into said pipe when said rod is in said first position and by preventing a majority of said gas from discharging to said pipe when said rod is said second position.

30. The assembly of claim 29 wherein said receiving and introducing means comprises:
   a first inlet in said housing in a spaced relation with said outlet for receiving and introducing said gas; and
   a second inlet in said housing, further spaced from said outlet than said first inlet, for receiving and introducing said gas.

31. The assembly of claim 30 further comprising a shoulder formed on the inner wall of said housing between said first and said second inlets to arrest the movement of said rod and prevent said rod from obstructing said second inlet, whereby said second inlet introduces said gas into said housing so that said gas must flow through said gap to discharge through said outlet.

32. The assembly of claim 31 further comprising first and second hoses respectively registering with said first and second inlets to deliver said gas to said housing, said second hose connected to said first hose to divert a portion of said gas from said first hose to said second hose.

33. The assembly of claim 32 further comprising a valve disposed within said first hose to control the flow of said gas through said first hose.

34. The assembly of claim 32 wherein said housing comprises:
   an aeration pipe comprising said first inlet and having first and second ends with said first end registering with said pipe containing said solids; and
   a cap comprising said shoulder and said second inlet, said cap connected to said second end of said aeration pipe.

35. The assembly of claim 34 wherein said cap and said second end of said aeration pipe are externally threaded, said assembly further comprising an internally threaded nut which connects said cap to said aeration pipe.

36. The assembly of claim 28 further comprising a shaft connected to said rod and projecting from said housing for moving said rod between said first and second positions.

* * * * *